United States Patent
Lu (10) Patent No.: US 7,107,264 B2
(45) Date of Patent: Sep. 12, 2006

(54) CONTENT BRIDGE FOR ASSOCIATING HOST CONTENT AND GUEST CONTENT WHEREIN GUEST CONTENT IS DETERMINED BY SEARCH

(75) Inventor: Qi Lu, San Jose, CA (US)

(73) Assignee: Yahoo, Inc., Sunnyvale, CA (US)

( * ) Notice: Subject to any disclaimer, the term of this patent is extended or adjusted under 35 U.S.C. 154(b) by 0 days.

(21) Appl. No.: 10/816,456

(22) Filed: Mar. 31, 2004

(65) Prior Publication Data

US 2004/0249800 A1   Dec. 9, 2004

Related U.S. Application Data

(60) Provisional application No. 60/460,653, filed on Apr. 4, 2003.

(51) Int. Cl.
  G06F 17/30    (2006.01)
  G06F 7/00     (2006.01)
(52) U.S. Cl. ............... 707/3; 707/5; 707/100
(58) Field of Classification Search ............ 707/3, 707/5, 6, 10, 100–102, 104.1, 2, 7, 9, 200–206; 709/217, 219, 226, 203; 715/513, 526; 706/12, 706/21, 25, 28
  See application file for complete search history.

(56) References Cited

U.S. PATENT DOCUMENTS

| | | | |
|---|---|---|---|
| 5,625,767 A * | 4/1997 | Bartell et al. ............... 345/440 |
| 5,829,002 A * | 10/1998 | Priest ........................... 707/10 |
| 5,894,554 A * | 4/1999 | Lowery et al. ............. 709/203 |
| 6,233,575 B1 * | 5/2001 | Agrawal et al. ................ 707/6 |
| 6,256,623 B1 * | 7/2001 | Jones ........................... 707/3 |
| 6,263,352 B1 * | 7/2001 | Cohen ........................ 715/513 |
| 6,356,906 B1 * | 3/2002 | Lippert et al. ................ 707/10 |
| 6,446,061 B1 * | 9/2002 | Doerre et al. .................. 707/3 |
| 6,446,083 B1 * | 9/2002 | Leight et al. ............ 707/104.1 |
| 6,463,430 B1 * | 10/2002 | Brady et al. .................... 707/3 |
| 6,665,658 B1 * | 12/2003 | DaCosta et al. ............... 707/3 |
| 6,675,205 B1 * | 1/2004 | Meadway et al. .......... 709/219 |
| 6,931,397 B1 * | 8/2005 | Sundaresan .................... 707/5 |

\* cited by examiner

Primary Examiner—Jeffrey Gaffin
Assistant Examiner—Jacques Veillard
(74) Attorney, Agent, or Firm—Brinks Hofer Gilson & Lione (57) ABSTRACT

A method and apparatus for generating content for an electronic content access system wherein requests for host content are received and responses to such requests include at least references to the host content requested and at least references to guest content related to the host content requested, comprising obtaining host content from sources external to the electronic content access system, importing the obtained host content to a host content database, distilling the host content to derive host content summary data for the host content, storing the host content summary data in an indexable structure and storing guest content in an indexable structure, such that a query using host content summary data can be applied as a search against the guest content to retrieve guest content related to the requested host content without requiring preassociated links to guest content.

12 Claims, 5 Drawing Sheets

CONTENT BRIDGE FOR ASSOCIATING HOST CONTENT AND GUEST CONTENT WHEREIN GUEST CONTENT IS DETERMINED BY SEARCH

CROSS REFERENCES TO RELATED APPLICATIONS

This application claims priority from co-pending U.S. Provisional Patent Application 60/460,653, entitled, "Content Bridge for Associating Host Content and Guest Content Wherein Guest Content is Determined by Search," filed Apr. 4, 2003, which is incorporated by reference herein for all purposes.

FIELD OF THE INVENTION

The present invention relates to content retrieval in general and more particularly to methods and apparatus for associating content and selecting content to be associated with other content.

BACKGROUND OF THE INVENTION

In a content retrieval system, a user makes a request for content and receives content matching that request. The user can be a human user interacting with a user interface of a computer that processes the requests and/or forwards the requests to other computer systems. The user could also be another computer process or system that generates the request programmatically. In the latter instance, it is likely that the requesting computer user will also programmatically process the results of the request, but it might instead be the case that a computer user makes a request and a human user is the ultimate recipient of the response, or even the opposite, where a human user makes a request and a computer user is the ultimate recipient of the response.

Content retrieval systems are in common use. One common system in use today uses the network referred to as the Internet, a global internetwork of networks, wherein nodes of the network send requests to other nodes that might respond with content. One protocol usable for content requesting is the HyperText Transport Protocol (HTTP), wherein an HTTP client, such as a browser) makes a request for content referenced by a Uniform Resource Locator (URL) and an HTTP server responds to the requests by sending content specified by the URL. Of course, while this is a very common example, content retrieval is not so limited.

For example, networks other than the Internet might be used, such as token ring, WAP, overlay, point-to-point, proprietary networks, etc. Protocols other than HTTP might be used to request and transport content, such as SMTP, FTP, etc. and content might be specified by other than URLs. Portions of present invention are described with reference to the Internet, a global internetwork of networks in common usage today for a variety of applications, but it should be understood that references to the Internet can be substituted with references to variations of the basic concept of the Internet (e.g., intranets, virtual private networks, enclosed TCP/IP networks, etc.) as well as other forms of networks. It should also be understood that the present invention might operate entirely within one computer or one collection of computers, thus obviating the need for a network.

The content itself could be in many forms. For example, some content might be text, images, video, audio, animation, program code, data structures, formatted text, etc. For example, a user might request content that is a page having a news story (text) and an accompanying image, with links to other content (such as by formatting the content according to the HyperText Markup Language (HTML) in use at the time).

HTML is a common format used for pages or other content that is supplied from an HTTP server. HTML-formatted content might include links to other HTML content and a collection of content that references other content might be thought of as a document web, hence the name "World Wide Web" or "WWW" given to one example of a collection of HTML-formatted content. As that is a well-known construct, it is used in many examples herein, but it should be understood that unless otherwise specified, the concepts described by these examples are not limited to the WWW, HTML, HTTP, the Internet, etc.

A supplier of content might determine the interests of its users and provide relevant content, such as current news, sports, weather, search services, calendaring, messaging, information retrieval and the like. Content might be in the form of pages that are static (i.e., existing prior to a request for the page), dynamic (i.e., generated in response to a request) or partially static, partially dynamic. Thus, a news report about an event in a particular city might exist as a static page, but that same content might also be generated dynamically in response to a request, taking into account the context of the content and/or demographics of the user making the request.

As an example of a dynamically generated page, if the news report was being viewed by a user known to live in city in which the event is to occur, the resulting page might include information about how to drive to the location of the event or to purchase tickets, however if the user is known to live far from that city, the resulting page might include information about the weather in that remote city and how to purchase an airline ticket to that city.

In the above example, host content (the news report) and guest content (the weather, purchase links, directions, etc.) are associated such that a request for the host content returns a page (for HTTP systems, or other content unit for other types of systems) containing the host content and related guest content.

It is a continuing problem to correctly determine relevant guest content. If the city for which the news story was relevant was correctly determined, the user demographics correctly determined and the city of the guest content was correctly determined, the presentation works well. However, if the news story is not actually related to a particular city or event, then associated guest content will look out of place and confuse the user.

One approach to host content and guest content association is to create predefined associations between host content and guest content. In such systems, a page containing host content H1 would always be presented with its associated guest content G1 alongside. This approach might work well with systems having a small amount of host content, but is typically unworkable at larger scales, such as a news feed, where the host content could comprise thousands of new news reports per hour.

Another approach is the taxonomy—taxonomy approach, wherein all, or most all, of the host content is assigned a node in a content taxonomy. The guest content is also assigned nodes in a corresponding context taxonomy or the same content taxonomy. Then, when host content is to be presented, the server reads the taxonomy node ID of the host content and then retrieves guest content that has a matching taxonomy node ID or IDs. This might work well when host content and guest content are well definable, but this approach does not scale well for large bodies of host content and guest content without much effort.

BRIEF SUMMARY OF THE INVENTION

A content system according to embodiments of the present invention associates host content and guest content. For host content, host content summaries are generated. To determine the guest content to associate with particular host content, the host content summary for the host content is analyzed and a search query generated. A host content dictionary and a host content taxonomy might be consulted. The search query is then applied against a guest content corpus, such as a guest content database, and the results of the query are used as the guest content to associate with the host content.

In specific embodiments, the user uses a Web browser to specify to a Web server host content of interest and the Web server processes the request, obtains the requested host content, generates a query for guest content, queries a guest content corpus, gets a query response, builds a page associating the host content with the query results, and returns the resulting generated page to the user. The guest content might be related content (such as news stories related to news stories), advertisements, relevant links, topics of relevance, items for sale, special offers, etc. The generation of the guest content query might involve merely reading a host content summary or it might be more involved.

In some embodiments, setting up the content might comprise obtaining host content from sources external to an electronic content access system, importing the obtained host content to a host content database, distilling the host content to derive host content summary data for the host content, storing the host content summary data in an indexable structure and storing guest content in an indexable structure, such that a query using host content summary data can be applied as a search against the guest content to retrieve guest content related to the requested host content without requiring preassociated links to guest content.

Other features and advantages of the invention will be apparent in view of the following detailed description and preferred embodiments.

DETAILED DESCRIPTION OF THE INVENTION

Embodiments of the invention will now be described, by way of example, not limitation. It is to be understood that the invention is of broad utility and may be used in many different contexts.

The example of a search process as described herein below can be modeled by a searcher presenting to a search system a query and receiving a response (search results) indicating the one or more "hits" found. A query can be in the form of key words (e.g., searching for the latest football scores with a query "football games scores recent"), structured query statements (SQL, Boolean expressions, regular expressions, etc.), by selecting terms from choice lists, following links or a number of other methods currently in use or obvious to one of skill in the art upon review of current literature and/or the present disclosure.

When a query is received by a search system, it processes the search and returns one or more "hits", where a "hit" is the atomic unit handled by the search system. For example, where the search system manages a structured database, the hits are records from the structured database. Where the search system manages documents, such as text documents, image and text documents, image documents, HTML documents, PDF documents, or the like, the atomic unit is the document. It should be understood that the present invention is not limited to any particular atomic unit, but by way of example, much of this disclosure describes searching using the document as the atomic unit. Furthermore, a structured database is not required.

A hit is an atomic unit that the search system identifies as matching criteria defined by the query. It should be understood that the search system need not provide all hits or only hits that match the query. For example, the search system might limit the number of hits returned to some number, might apply other limitations to the query term, such as omitting hits that match the query, ignore duplicate hits, etc. The search system might also expand the search results to include hits that almost match the query, hits that are designated to be included in searches, such as special topic hits, advertising hits, etc. Some expansion or contraction might be dependent on the size or content of the search results prior to such expansion or contraction. For example, the search engine might add hits that are close if no hits would otherwise be returned and might remove hits if too many hits would have been returned, such as by deleting common words from queries prior to completing the search results.

A searcher can be a human user, such as a person typing in search terms into a browser window to query a search engine via the Web, but can also be an automated process, such as a computer program capable of sending queries to search engines in the form expected by the search engine. For example, a computer program might generate queries and form HTTP messages directed at a Web server coupled to a search engine.

In many of the examples shown herein, the search engine searches among a set of documents for documents (hits) that match the criteria defined by the query. It should be understood that the term "document" is generally used to refer to units of the corpus being searched. A document can be a document, such as a contract, a file, a story, a writing, or the like, but might also be a snippet of text, data that might be considered part of a document in other contexts, program code, image data, a stored file, or the like. Therefore, the term need not be narrowly construed.

Referring now to the figures, an exemplary content system will now be described.

Figure 1:
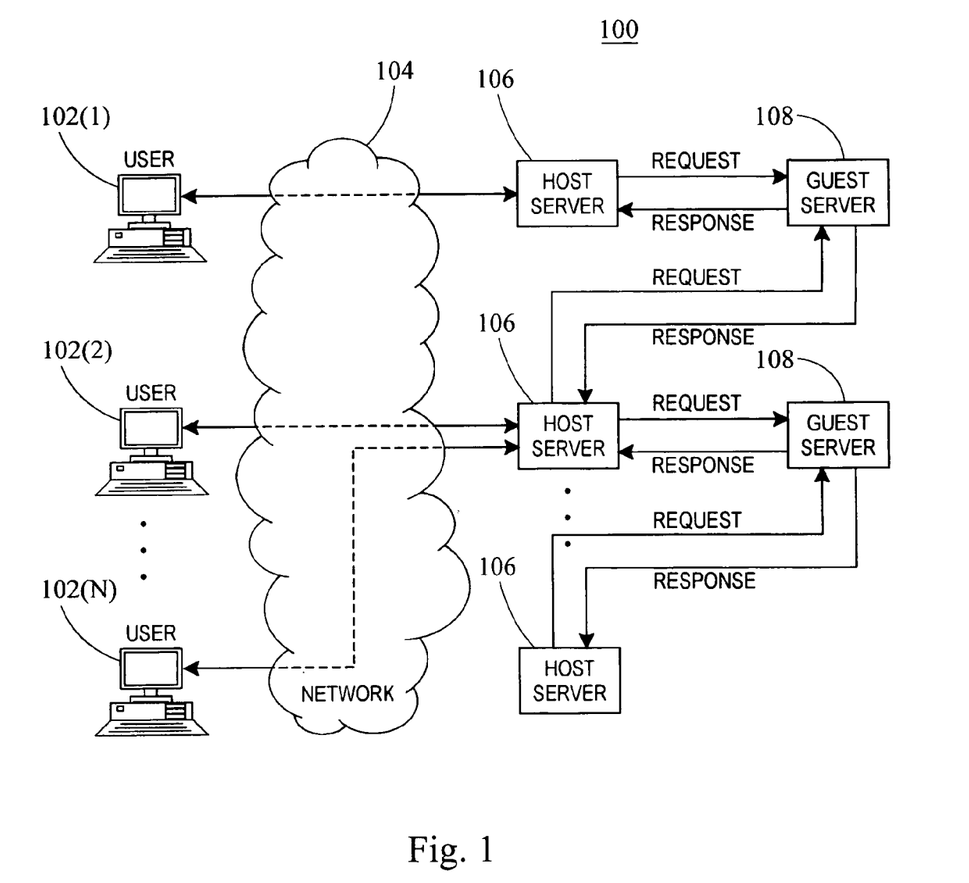
FIG. 1 is a block diagram of a content system according to embodiments of the present invention.

FIG. 1 is a block diagram of a content system 100 according to embodiments of the present invention. Using system 100, a content requester, referred to herein simply as a "user" or "client", requests content from a server, which returns the requested content. As shown there, system 100 includes user systems 102, a network 104, host servers 106 and guest servers 108. The interconnections between user systems 102, network 104 and host servers 106 will not be described in detail, as such methods of interconnections can be accomplished using well-known techniques.

For example, user systems 102 might be personal computers running an HTTP client, such as a Web browser, and communicating with an HTTP server running at the host server, where network 104 is a TCP/IP network such as the global Internet. It should be understood that other embodiments also fall within the scope of the invention. For example, user system might be a handheld device, a computer with no human user interface, a dedicated device, a kiosk, etc. The network might be a wireless protocol network, a local area network, a wide area network, a network running other than TCP/IP. Also, the clients and servers need not use HTTP, but might use a different protocol for making requests for pages and objects and for responding to those requests.

The interconnections shown in FIG. 1 will now be described, with the understanding that other connections might exist and not be shown. User systems 102 interact with host servers 106. In one example, they interact using HTTP over TCP/IP. There need not be a one-to-one correspondence between user systems 102 and host servers 106 and, in fact, most implementations involve a host server serving thousands or millions of user systems. While it will often be the case that a given user system 102 will connect to one host server 106 at a time, nothing prevents a user system 102 from maintaining connections with multiple host servers 106. In some implementations, for scaling, security and/or performance, traffic servers are interposed between network 104 and host servers 106. A traffic server might perform load balancing, routing user requests to one of a plurality of host servers that could handle the request, so that the load is evenly spread over the host servers (or at least so that not too many host servers get overloaded).

The user systems typically initiate a connection by making a request for particular content, such as a news report. The content that is specifically referenced by the request is referred to herein as the "host content". "Guest content" refers to content that is presented to the user along with the host content, but is not necessarily referenced by the request. For example, the user might click on a link of headlines and thus initiate a request for the news story for which the clicked link is specifically coded for. The page returned to the user can have the content associated with the clicked link, but might also have "guest content", which is determined separate from the host content.

Where the host server is the main point of interaction with the user, the host server determines the host content being requested, obtains suitable guest content for the page(s) of host content, and returns that to the user in response to the request. Where the host server is not the main point of interaction, the machine that is interacting with the user might perform this assembly step instead. Thus, in the first example, the user system sends a request for host content to the host server, the host server in turn makes a request of a guest server 108, receives guest content in response, and the host server returns the host content with the guest content as a response to the user system.

Note that there need not be a one-to-one or even a one-to-many relationship among host servers and guest servers. Therefore, a host server might interact with one or more guest server and one or more guest servers might provide guest content to more than one host server. One method for determining host-guest interactions is a configuration file maintained for a host server that specifies which guest server the host server should query for particular host content. For scalability, performance, security or other reasons, one or more guest server might be mirrored such that several guest servers hold mirror images of the same data. The selection among one of several guest servers might be done using well-known selection techniques, such as a round-robin technique.

Of course, what is returned might include links rather than containing the actual content. For example, the host server might return a page that contains links to specific guest content instead of sending the guest content as part of the page. If that is the case, the role of the guest server might not include sending the guest content, but merely determining, from context, what guest content to send and sending a specific reference (such as a URL) to that content.

Figure 2:
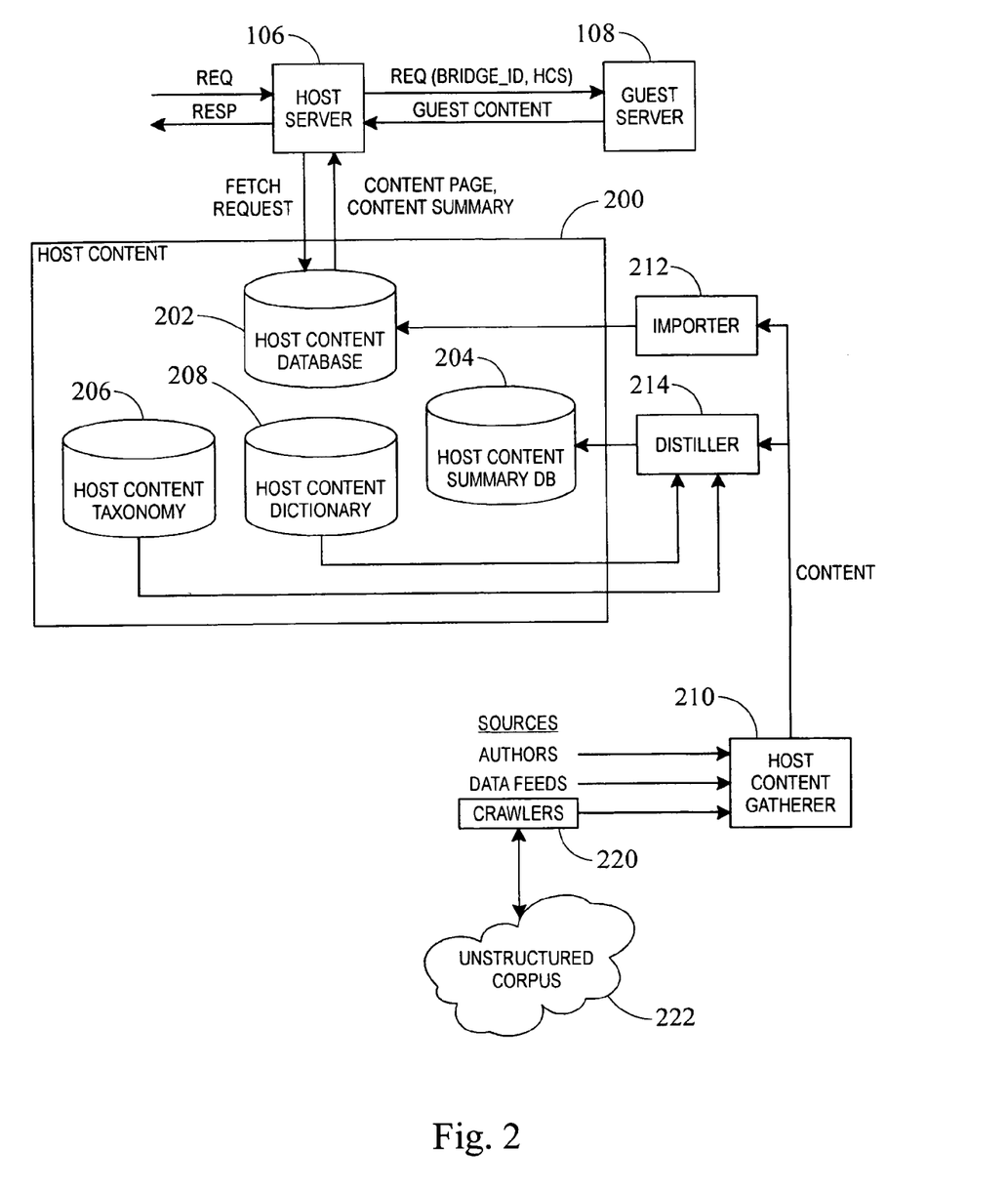
FIG. 2 is a block diagram showing elements of the content system of FIG. 1 in more detail, showing interactions between a host server and other elements.

FIG. 2 illustrates aspects of host content management in greater detail. As illustrated there, a host server makes a fetch request for host content 200 from host content database 202. Host content might also be construed as including a host content summary database 204, a host content taxonomy 206 and a host content dictionary 208. Host content might be stored in relational database structures, hierarchical structures, directory name structures, file systems or the like, such that it is retrievable on request, but no specific structure or database format is required. Thus, the host content might be stored as records in a relational database, but might be stored in a database-file association wherein some of the information about the host content is in a structured, record-oriented database while other portions of the information are stored in files referenced by the database. The host content might also include XML files. However, for brevity, such storage is referred to as a database.

Host content database 202 is populated by a host content gatherer 210, as well as possibly other mechanisms not shown. As host content gatherer 210 obtains host content, it provides it to an importer 212 that imports the content and formats it as needed to include in host content database 202. For example, importer 212 might add tags to text portions of the content. Host content database 202 might be populated from document generators, such as an intranet document generator, another type of document generator, a document set crawler that crawls through a network space to generate a document set or a mapping to documents in the network space, an Internet crawler that crawls the Internet following hyperlinks to identify documents to be part of the host content, a hierarchical document structure such as compendiums of XML structured documents, or other sources of documents or document references.

Host content summary (HCS) database 204 is populated as well by host content gatherer 210, and HCS database 204 might be populated as well by other mechanisms not shown. As host content gatherer 210 obtains host content, it provides it to a distiller 214 and distiller 214 generates a summary for the host content and stores it in HCS database 204. In the process of summarizing host content, distiller 214 might reference host content taxonomy 206 and host content dictionary 208.

One use of host content taxonomy 206 might be to generate host content summaries that are dependent on one or more positions of the host content in the host content taxonomy. The host content taxonomy might be generated automatically, generated manually, supplied from the external source that supplies the host content or supplied from another external source.

One use of host content dictionary 208 is for identifying phrases that are understood and specific to the area of the host content. For example, where the host content is a stream of sports stories, the professional football team names and popular players would be phrases stored in the host content dictionary. Likewise, where the host content is a stream of financial news stories, active company names and financial news terminology might be included as phrases stored in the host content dictionary.

Host content gatherer 210 can obtain its host content from a variety of sources. For example, authors might provide works especially for inclusion in host content database 202. Other host content might come from data feeds, such as feeds of sports scores, news, weather, financial performance, etc. Host content gatherer 210 might also obtain host content from crawlers 220 that "crawl" an unstructured corpus 222 to obtain additional host content. As an example, an unstructured corpus might include the collection of static and/or dynamic documents formatted as hyperlinked pages stored on HTTP servers and available over the Internet, generally referred to as the "World Wide Web", or simply "the Web". In that example, the crawler might gather pages, identify other pages from links present on the already gathered pages, gather other pages, determine from already gathered pages what other pages to gather, etc. and provide the gathered pages to host content gatherer 210 for inclusion in host content database 202.

Note that the actual content of all of the host content supported by host content database 202 need not be stored there. In some embodiments, it might be sufficient for crawler 220 to note the references to the host content (such as it's URLs) and pass those to host content gatherer 210. When the content is actually needed, such as for some steps of distillation, the content can be retrieved. Thus, crawler 220 might determine that a particular page is suitable for inclusion in the host content and pass the page's URL to host content gatherer 210, which would then provide the URL to importer 212 and distiller 214. If distiller 214 needed to know the content of the page being imported, it could use its facilities to make a request over a network for the content using the provided URL. Also, if the content is only available by reference in host content database 202, host server 106 might retrieve URLs from time to time from host content database 202 and use its separate facilities to obtain the host content for a response to a user.

Host content database 202 might be a database strictly speaking, but might also be a non-database structure. For example, it might be a large XML document. As explained herein, "document" is used generally herein to refer to data that is treated as a unit for querying purposes.

An operation of the elements shown in FIG. 2 will now be described. Preferably before a user system makes a request of host server 106, host content 200 is available. Host content can be created in a number of ways, one of which is that host content gatherer 210 receives host content (or references thereto, in the form of URLs or other references) and provides the host content or references to importer 212 and distiller 214. Importer 212 stores the host content, or the references, in host content database 202. Importer 212 might import the host content unchanged, but might also alter the host content, such as by formatting it as needed or desired and possibly adding tags.

Distiller 214 generates host content summaries for the host content provided to it. Through this process, the host content and related summaries are generated. Host content taxonomy 206 might be populated from an external source or automatically determined. Host content dictionary 208 might be populated in a semi-automated fashion and might be periodically updated. For example, where the names of professional sports players are included in host content dictionary 208, those names might be updated at the beginning of each season.

Once host server 106 receives a request from a user system for host content, it begins the response process. Typically, but not required, the user system request includes a URL referencing the requested host content. In many cases, the user system would obtain the URL in another page that has a hypertext link to the requested host content. When a user at the user system clicks or otherwise selects the hypertext link, the user system generates the request for the referenced host content and directs the request to host server 106.

Having the reference, host server 106 makes a fetch request to host content 200, often in the form of a request for information from host content database 202. In response, host server 106 receives a content page and host content summary back. If the host content does not include the referenced content, host server 106 might reply with an error message, or send a message to crawler 220, host content gatherer 210, a Web client, or some other object, to obtain the referenced content.

The host can generate a bridge_ID for that host content and supply the bridge_ID to the guest server, which the guest server can use for tracking and other purposes. In some embodiments, the guest server that is used is determined by the bridge_ID and the guest content that works well is determined by the bridge_ID. Multiple bridge_ID values might be used with the same host content.

If host server 106 has or gets the requested host content, it then sends a request to guest server 108 as needed to obtain guest content. In many cases, the host content pages will have placeholders indicating where guest content is to go. One manner of implementing this is for host content pages to be formatted as HTML pages with hyperlinks to included elements, where the hyperlinks reference the guest server. Such hyperlinks might have embedded therein the bridge_ID and host content summary for the page to be returned to the user. Host content pages might have other links to information that is not considered guest content. For example, host content pages might have a standardized set of icons for common actions. For those areas of a user's display of a page, the host server (or the user system) need not query guest server, but would have a URL for the element referenced by the host server.

Guest server 108 then replies with the guest content according to the request. As explained below, typically the host server does not request specific guest content known ahead of time, as that might more easily be stored with other host content. Instead, the guest content is typically determined at run-time based on the user's demographics, operating parameters (time of day, number of campaigns in operation, etc.) and the content available to the guest server at the time.

With the host content and the guest content in hand, host server 106 returns a page to the user system responsive to its request. What is returned can be either the content itself, or content including links to elements of the host content and the guest content. For example, where the requested host content is a news story, what is returned might be the text of the news story, a link to a related photograph, a link to a guest content image and links to related stories, all formatted as an HTML page. In that example, then, it might be the user system's HTTP client that does the actual integration of the host content and the guest content, even though it was the action of the host server and the guest server to determine what host and guest content would appear. The use of bridge_ID values to associate host content with guest content that is served together allows for easy tracking of the associations. For example, if the guest host logged bridge_ID values with indicators or guest content that was served, the combinations of host content and guest content could be tracked for various purposes, such as measuring performance of content and the content delivery system.

Figure 3:
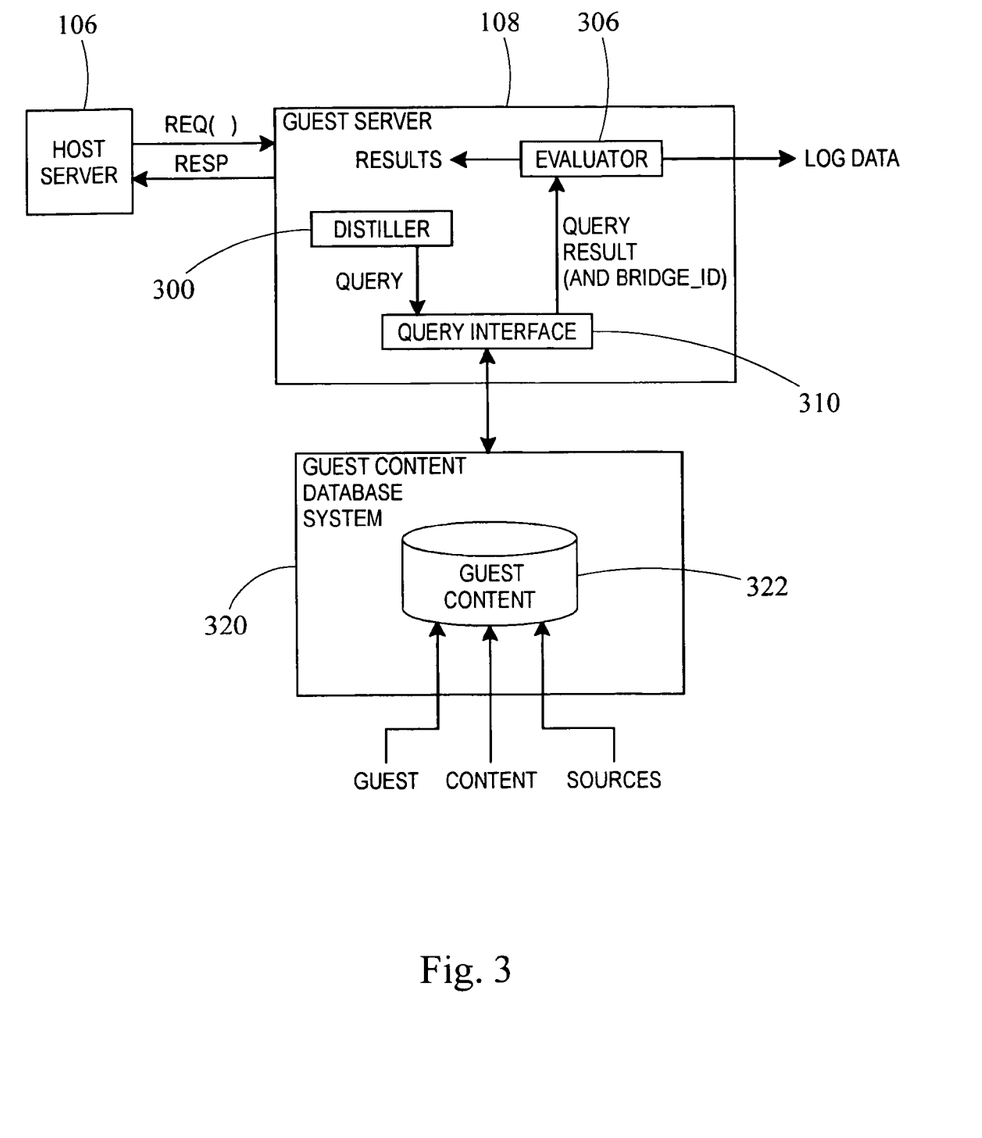
FIG. 3 is a block diagram showing other elements of the content system of FIG. 1 in more detail, showing interactions between a guest server and other elements.

FIG. 3 illustrates guest server 108 in greater detail, including a distiller 300 that interfaces with a query interface 310. Query interface 310 is shown coupled to a guest content database 320, which might be direct database access or access via a database application that handles interaction with guest content 322. Also shown in an evaluator 306 that receives guest content results, evaluates the results (such as to select a subset of the results), and provides results as the response to the host server request, as well as providing log data.

In operation, guest server 108 receives a request from a host server. The request includes an indication of the bridge_ID and the host content summary. The host content summary might be structured as a query string and guest server 108 could then obtain query results using the query string and use those results as the guest content to be provided. In a very specific example, the bridge_ID might be a number such as bridge_ID=58792 and the host content summary might be "gourmet cooking wild mushrooms" for a news article about a wild mushroom recipe from an upscale restaurant.

Distiller 300 might obtain query results as follows. In a simple case, distiller 300 provides the host content summary as the query. In other variations, the distiller might interface to bridge configuration database 302 to obtain configuration records for the identified bridge_ID values and then formulates a query for guest content.

The query is preferably in the form of a query and query interface 310 or guest content database system 320 performs a search from that query. Guest server 108 uses the results of the search as what it returns to the host server in response to the host server's request for guest content.

Guest content 322 can be generated in a number of ways. For example, where advertising campaigns are included in guest content, content might be associated with certain search terms. When distiller 300 arrives at a search query to present to query interface 310 and the set includes the associated certain search terms, the query results would include the associated content. Of course, if more content is returned than guest server 108 can provide to the host server, it should select some of the content to return. This might happen, for example, where multiple advertising campaigns are running simultaneously, or the host content has more than one context. For example, a news story about San Francisco-New York interactions might be summarized as being about San Francisco as well as summarized as being about New York. If the host content included one area for a weather report for whatever city is related, guest server 108 might retrieve the weather for both cities and return only one, based on a random selection, a determination about which weather report might be more extreme, more current, etc., or based on some other criteria. Guest content might be included or based on how prior viewers reacted to it and/or demographics.

Guest content might include advertisements, alerts from the operator of the access system, leads to related host content, offers, notes or the like. Guest content that is returned as part of a query might be adjusted or reordered based on other factors, such as how a bridge performed. For example, if guest content relates to a sports team, but the request is made during the off season, guest content related to television viewing times and travel to the team's home city would be given a lower priority (perhaps not even shown) relative to guest content related to training reports, team changes, fantasy leagues, etc. This is one example of reordering—this example assumes that during the active season some content is going to be more interesting than outside the active season.

Other reasons for reordering might relate to paid placements. For example, if the guest content query returns more sales offers for team-related items than can be displayed, the offers might be ordered and included or not based on payments for placement.

Figure 4:
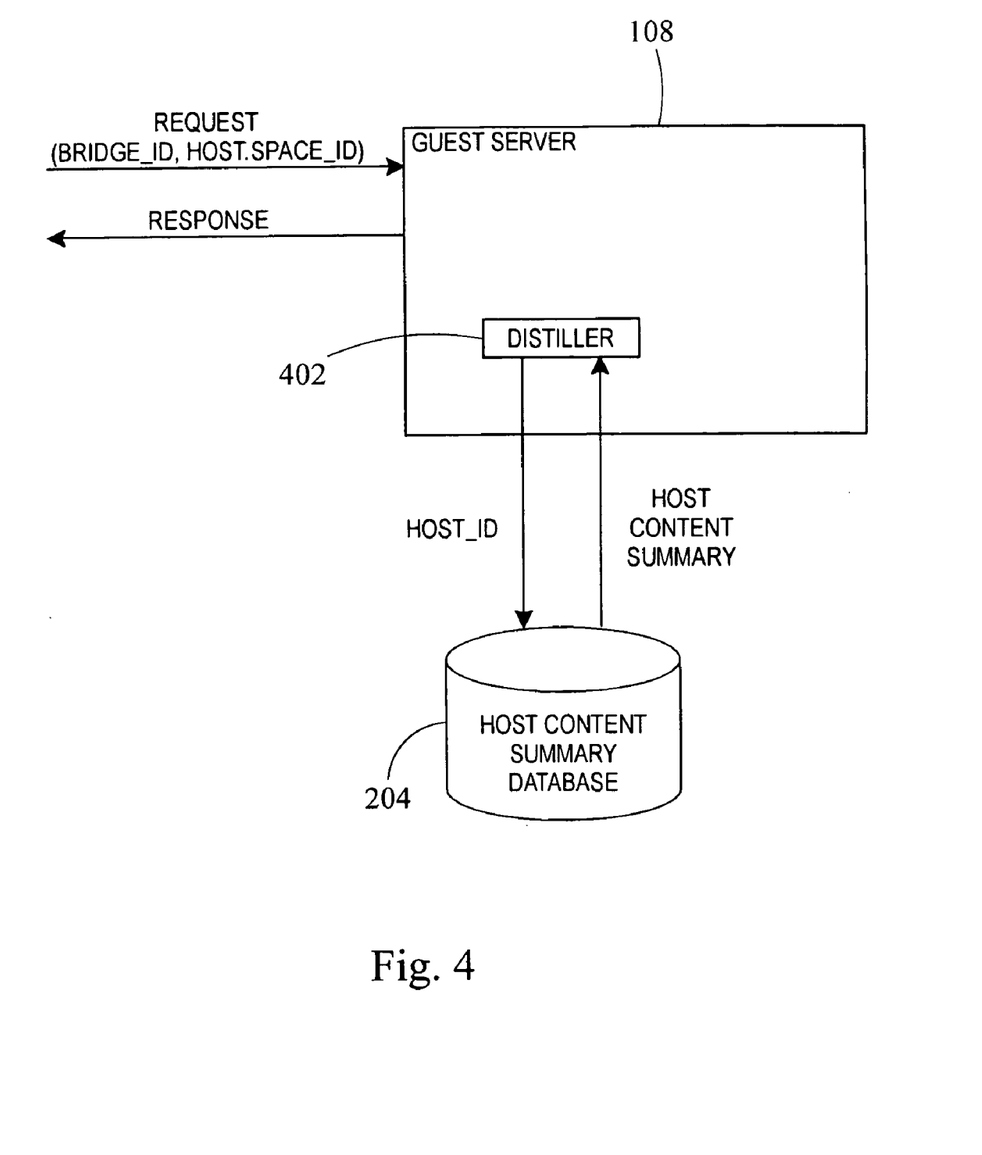
FIG. 4 illustrates an alternative approach to generating queries, using references to host content summaries in requests to a guest content server.

FIG. 4 illustrates a variation of GCQC 300, wherein guest server 108 receives a request that includes a host_ID rather than needing to include a reference to a bridge. And a distiller 402 uses the host_ID to obtain host content summaries. In this case, guest server 108 uses the host_ID to obtain host content summaries from HCS database 204.

Figure 5:
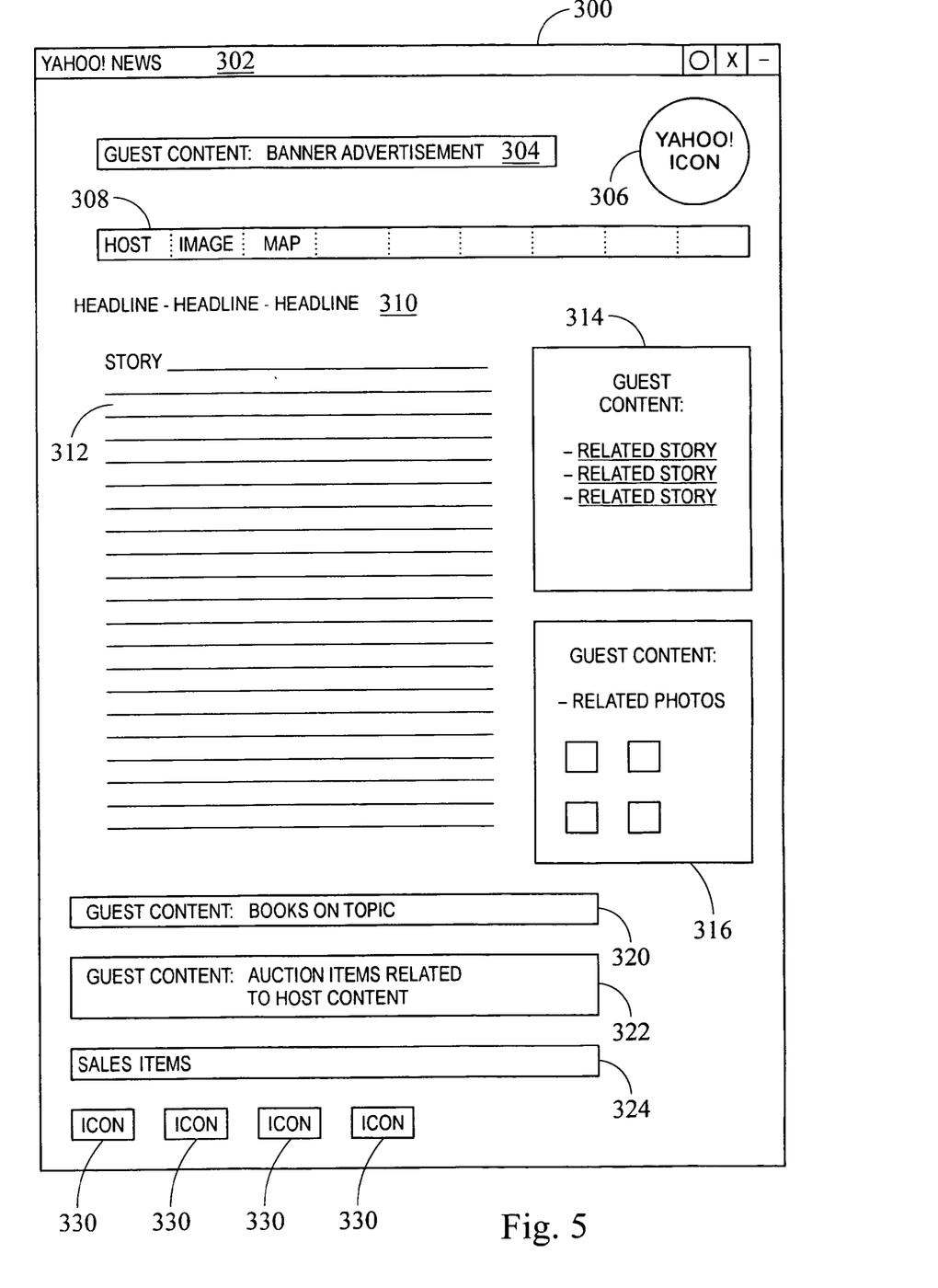
FIG. 5 is an illustration of a page that might be presented to a user, including host content and guest content.

FIG. 5 illustrates a sample page 300 as might be displayed on a user system combining host content and guest content. Such a page might include host content, guest content and common page elements. Host content in this example includes a title 302 and a story 312 with a headline 310. Guest content in this example includes a banner advertisement 304, a related story sidebar 314, a photo sidebar 316, a book offerings banner 320, an auction items banner 322 and a sales items banner 324. Common page elements, which might be present on each similarly-formatted page but not required, include a home page icon 306, a host image map 308, and icons 330.

Using methods and/or apparatus described above, sample page 300 might have been presented to a user system in response to some identified host content (the news story), in response to the request, a host server supplying the news story would combine the news story on the sample page with guest content obtained based on a search of guest content. While banners, such as advertisements, and sidebars can be fixed to specific host content, having guest content determined from a search allows for more relevant guest content and provides other advantages.

Example Implementation

An example of a host server is a Yahoo! server, such as Yahoo! Sports, Yahoo! Weather, Yahoo! News or Yahoo! Travel servers. Each page of these properties can be considered a "host page" possibly including placeholders for latter inclusion of guest content.

Guest content can be derived from another Yahoo! property, the same Yahoo! property or any other Web site or source. For example, a host content story about a particular sporting event might have links to other sporting events (the same property) but might also have links to guest content for making airline reservations to the city in which the sports event is being held. Such guest content might come from the Yahoo! Travel property.

The guest content can be stored in a guest content database, which is a data structure that allows for queries against a search index. Thus, the guest content need not be retrieved by exact reference to particular guest content. Instead, guest content is retrieved according to a search process based on a search query.

The search query that goes with particular host content might be the host content summary for that host content or might include elements from a host content summary, which might be done ahead of time. Thus, as each sports-related story is input to a host content database, its content is summarized. If the story is about particular teams or people, the summary might make reference to those particular teams or people. For example, if the story is about a championship game, the summary might include the name of the championship game, the sports league, the names of the teams, their home cities, the date(s) of the game(s), etc. This host content summary can be the result of a distillation process as the host content is received, but the host content summary might be updated as time goes on, based on additional information learned later or for other reasons. The host content summary might also be obtained later, to allow host content to come on line quickly. In that case, the guest content might not be as relevant before the host content summary data is available.

In one embodiment of the content distillation process, the host content is scanned for keywords and those keywords are determined using a content dictionary (e.g., all the sports team names for major or significant leagues, sports player/coach/manager/owner names for those teams, home cities, etc.). A content taxonomy might also be used to classify the host content. For example a story about a running back on the Pittsburg Steelers football team might be associated with the nodes in a sports hierarchy at various levels: "football", "NFL", "AFC", "Pittsburgh Steelers", "running backs", down to a node for that particular player.

The guest content could also be associated with links in the hierarchy and associated with host content based on a match of hierarchy associations, but that is not very scalable and using search at the time of request allows for dynamic changes to guest content, quicker response and potentially more relevant responses. When guest content is needed for given host content, one or more of the host content summary, host content taxonomy paths, host content dictionary associations, etc., are used to form a search query. The host content summary could itself be a search query argument, in which case the guest server might not need to interact with the host content taxonomy or host content dictionary.

The search query is then applied to the guest content and the query results provide guest content to be provided with the host content. For example, for host content relating to a running back on the Pittsburg Steelers football team, the guest content might be searched using "NFL Pittsburgh Steelers" with the search query directed against all products from the Yahoo! Shopping property, with offers selected from the results based on some text relevancy criterion.

Content distillation can be done automatically on the fly, without requiring efforts of a host content publisher or a host server. For example, when a new page is published, the content distiller can scan that page and extract out key content summary. If links to trigger guest content are to be included in the host content, that new page might be embedded with references that are sufficient to trigger guest content retrieval. For example, it might be enough that a guest content management system provides the host server with a snippet of JAVA™ code to call a guest content management system with a reference to the host content. Content distillation can be done dynamically on the client side using mechanisms such as JAVASCRIPT™ code so that the work for a host publishing server is limited to embedding a JAVASCRIPT call.

In some cases, the guest content could be "subsetted". For example, where a news story is about two teams, there could be one set of guest content for the first team and another set of guest content for the second team, possibly the result of two independent searches of the guest content.

In yet another variation, the searches of guest content are informed by user demographics. In other words, the search query for guest content might differ from user to user based on their demographics. For example, a guest content search might find several items of suitable guest content, more than would be presented to the user, and the guest content server might select among those items based on user demographics.

The invention has now been described with reference to the preferred embodiments. Alternatives and substitutions will now be apparent to persons of skill in the art. Accordingly, it is not intended to limit the invention except as provided by the appended claims.

What is claimed is:

1. Using a computer system with access to electronically retrievable content in digital form, a method of providing content in response to a request, comprising:
  receiving a request for specific host content;
  obtaining the host content;
  formulating a search query based on the host content, wherein the search query is based on the host content obtained;
  applying the search query to a search engine to search an index of guest content;
  identifying guest content associated with the host content based on the search query in the index of guest content; and
  providing the host content and at least a reference to at least some of the guest content with the host content in response to the request.

2. The method of claim 1, wherein a host content summary is used as the search query.

3. The method of claim 1, wherein the host content is requested from a user system via an HTTP request including a URL referencing the host content, wherein the search query is a string of one or more keywords to which the host content relates, and wherein the guest content comprises one or more of advertisements, related content references and context-specific page features.

4. A method of generating content for an electronic content access system wherein requests for host content are received and responses to such requests include at least references to the host content requested and at least references to guest content related to the host content requested, the method comprising:
  obtaining host content from sources external to the electronic content access system;
  importing the obtained host content to a host content database;
  associating at least some of the host content with terms in a host content dictionary;
  associating at least some of the host content with nodes of a host content taxonomy, wherein the host content taxonomy is a hierarchy of topics;
  distilling the host content to derive host content summary data representing a summarization of the host content;
  storing the host content summary data in a first indexable structure; and
  storing guest content in a second indexable structure, the second indexable structure configured such that a search query derived from the host content summary data for the host content requested can be applied as a search against the second indexable structure to retrieve guest content related to the host content requested without requiring that each host content object have a preassociated link with guest content to be provided in response to the request for host content.

5. The method of claim 4, wherein the terms in the host content dictionary comprise one or more words.

6. The method of claim 5, wherein at least some of the terms in the host content dictionary comprise more than one word, with the more than one word having an order among the words.

7. The method of claim 4, wherein some host content is associated with more than one node of the host content taxonomy.

8. The method of claim 4, wherein distilling uses the contents of the host content dictionary and host content taxonomy.

9. The method of claim 4, wherein the host content summary data is usable as the search query to be applied against the guest content.

10. A content display, implemented by a computing device capable of displaying data retrieved over a network, the content display comprising:

host content that is obtained over the network in response to a request initiated by the computing device, wherein the request includes a reference to the host content being requested; and guest content that is obtained over the network and is determined in part by the results of a search of a guest content corpus done following receipt of the request by a host server wherein the search of the guest content corpus is based on search parameters that are based at least in part on a host content summary and the host content summary is based at least in part on a taxonomy path representing a node in a host content taxonomy with which the requested host content is associated, and terms in a host content dictionary with which the request host content is associated.

11. The content display of claim 10, wherein the reference to the host content is a URL and the request is an HTTP page request.

12. The content display of claim 10, wherein the host content summary data is usable as the search query to be applied against the guest content.

* * * * *